A. J. BALDWIN.
POULTRY ROOST.
APPLICATION FILED JAN. 8, 1909.
932,669.
Patented Aug. 31, 1909.
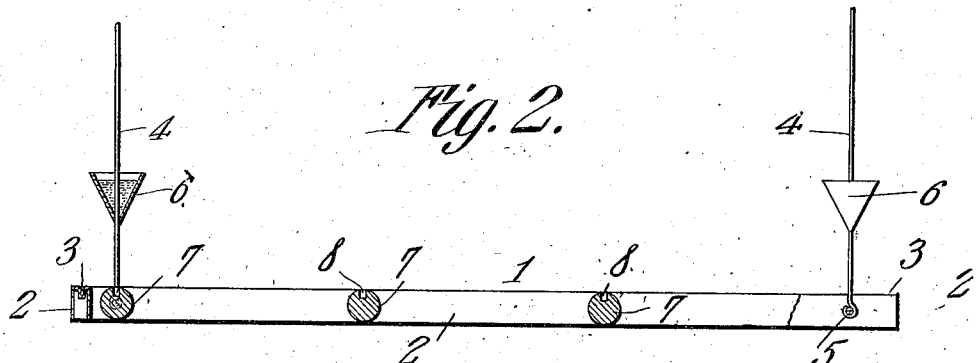
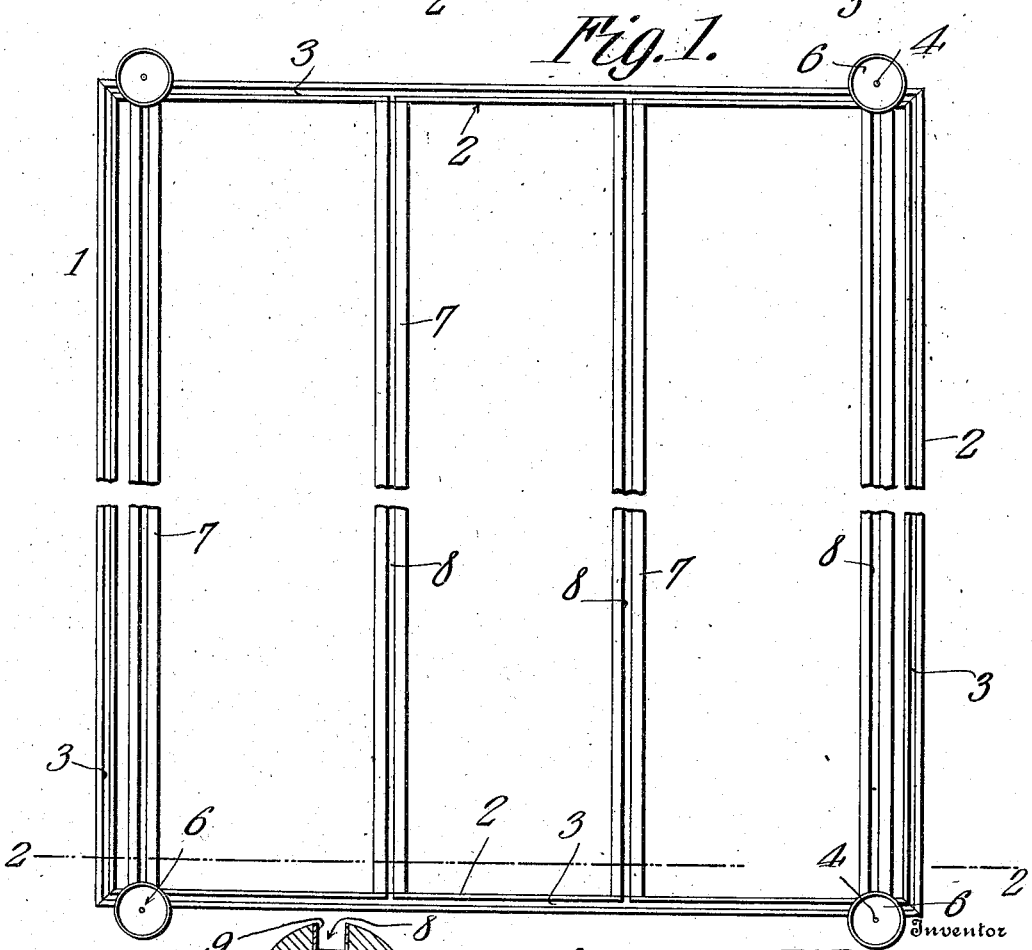

UNITED STATES PATENT OFFICE.

ANDREW JACKSON BALDWIN, OF BOULDER CREEK, CALIFORNIA.

POULTRY-ROOST.

932,669.  Specification of Letters Patent.  Patented Aug. 31, 1909.

Application filed January 8, 1909. Serial No. 471,349.

*To all whom it may concern:*

Be it known that I, ANDREW JACKSON BALDWIN, a citizen of the United States, residing at Boulder Creek, in the county of Santa Cruz and State of California, have invented a new and useful Poultry-Roost, of which the following is a specification.

The objects of the invention are, generally, the provision in a merchantable form, of a device of the class above described which shall be inexpensive to manufacture, facile in operation, and devoid of complicated parts; specifically, the provision of a poultry roost of novel and improved construction, the said roost being so constructed as to retain an insecticide into which the feet of the fowl may dip, for the destruction of hen lice and other parasites resident upon the feet of the fowl; the roost being so constructed that the insecticide cannot permeate the body of the structure; means being provided whereby the insecticide, if in liquid form, may flow readily from one part of the device to another, so that one portion of the insecticide may not become vermin laden and impotent, while other portions thereof remain relatively fresh; other and further objects being made manifest hereinafter as the description of the invention progresses.

The invention consists in the novel construction and arrangement of parts hereinafter described, delineated in the accompanying drawings, and particularly pointed out in that portion of this instrument wherein patentable novelty is claimed for certain distinctive and peculiar features of the device, it being understood, that, within the scope of what hereinafter is thus claimed, divers changes in the form, proportions, size and minor details of the structure may be made, without departing from the spirit or sacrificing any of the advantages of the invention.

Similar numerals of reference are employed to denote corresponding parts throughout the several figures of the drawings.

In the accompanying drawings, Figure 1 shows the poultry roost of my invention in top plan; Fig. 2 is a transverse section on the line 2—2 of Fig. 1; and Fig. 3 is a transverse section of one of the perches, designed to show one form of a non-absorbent lining adapted to be assembled therewith.

In carrying out my invention, I provide, primarily, a frame, denoted generally in the drawings, by the numeral 1. This frame 1 is formed from strips 2 which may be variously fashioned. In the present instance, they consist of inverted, trough-like metal members, which are longitudinally depressed to form a groove 3 in the upper face of the frame 1, the said groove extending entirely around the frame, and adapted to receive an insecticide in the form of a paste, liquid or powder. The frame is held in position so that it cannot touch the walls or other parts of a poultry house, by a number of depending wires, or other elements adapted to a like end, denoted by the numeral 4. The upper ends of these elements 4 are adapted to be assembled with an overhead support (not shown), their lower ends being preferably assembled with screws 5 which are inserted into the frame 1 adjacent the corners thereof. These elements 4 form the sole connection between the frame 1 and the overhead support with which it is assembled, and in order to prevent parasites from descending the wires 4 and finding lodgment upon the frame, a cup 6 of any desired shape is mounted upon each of the wires 4, to hold an insecticide, the wires passing through the cup 6, which, in the present instance, is illustrated in the form of an inverted cone.

Terminally assembled with the frame 1, are a plurality of perches 7, which, in order to provide an inexpensive structure, may be fashioned from wood. These perches 7 are provided with a longitudinal groove 8 communicating with the groove 3 of the frame, and, like the groove of the frame, adapted to hold an insecticide.

It has been pointed out hereinbefore, incidentally, that, by providing a groove continuous throughout the frame and the perches, the insecticide which is mounted in the groove, may flow readily from one part of the device to another, so that all portions of the insecticide may be and remain of equal strength; and to the advantages incident to this structure, attention is now formally called.

As hereinbefore stated, the perches 7 may be fashioned from wood, and, when this construction is determined upon, it is desirable to line the grooves of the perches with a non-absorbent material, so that the insecticide may not permeate into the body of the perches. This non-absorbent lining may be of any form. In Fig. 3, I have lined the grooves 8 with a metallic trough 9; and this construction is satisfactory. When, however, it is the aim of the builder to provide an inexpensive structure, the grooves 8 may be coated with paraffin.

The frame of the device is so constructed that it promotes the rigidity of the structure, and, when the roost is assembled in complete form, the result will be a light and inexpensive device well adapted to protect the fowls against the inroads of parasites, and to kill such parasites as may be upon the feet of the fowls.

Having thus described my invention, what I claim as new and desire to protect by Letters Patent is:—

1. A roost for fowls comprising a frame fashioned from inverted, trough-like metal members, the said members being longitudinally depressed to form a continuous groove in the upper face of the frame; transverse perches terminally assembled with the frame and provided with grooves communicating with the grooves in the frame to form a channel continuous throughout the upper face of the device; and a non-absorbent lining disposed in the grooves of the perches.

2. A roost for fowls comprising a frame fashioned from inverted, trough-like members, the said members being longitudinally depressed to form a continuous groove in the upper face of the frame; transverse wooden perches terminally assembled with the frame and provided with grooves communicating with the grooves in the frame to form a channel continuous throughout the upper face of the device; the grooves in the perches being coated with paraffin.

In testimony that I claim the foregoing as my own, I have hereto affixed my signature in the presence of two witnesses.

ANDREW JACKSON BALDWIN.

Witnesses:
A. W. HUDDLESON,
B. LIPSE.